WATER VAPOR INFLUENCE ON BUTANE ACTIVITY

EFFECT OF WATER VAPOR ON BUTANE LIMITING CURRENT

April 29, 1969  M. BELTZER  3,441,443
PROCESS OF OPERATING FUEL CELL WITH HYDROCARBON FUEL
AND PYROPHOSPHORIC ACID ELECTROLYTE
Filed Oct. 18, 1965
FIG. 3
OXYGEN PERFORMANCE IN PHOSPHORIC AND PYROPHOSPHORIC ACIDS
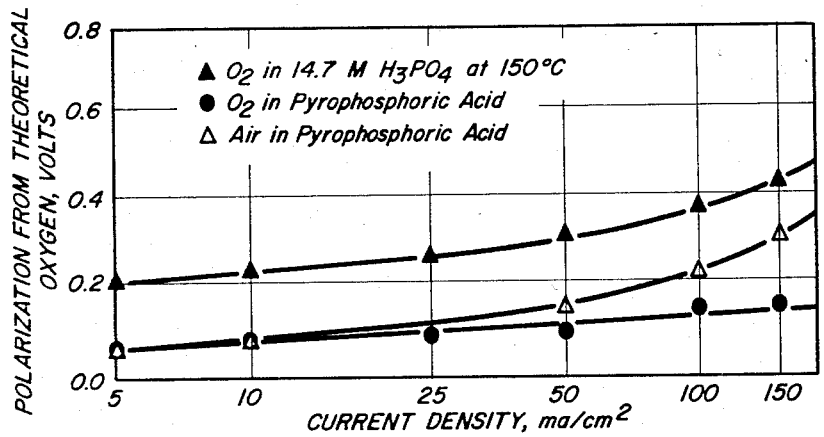
▲ $O_2$ in 14.7 M $H_3PO_4$ at 150°C
● $O_2$ in Pyrophosphoric Acid
△ Air in Pyrophosphoric Acid
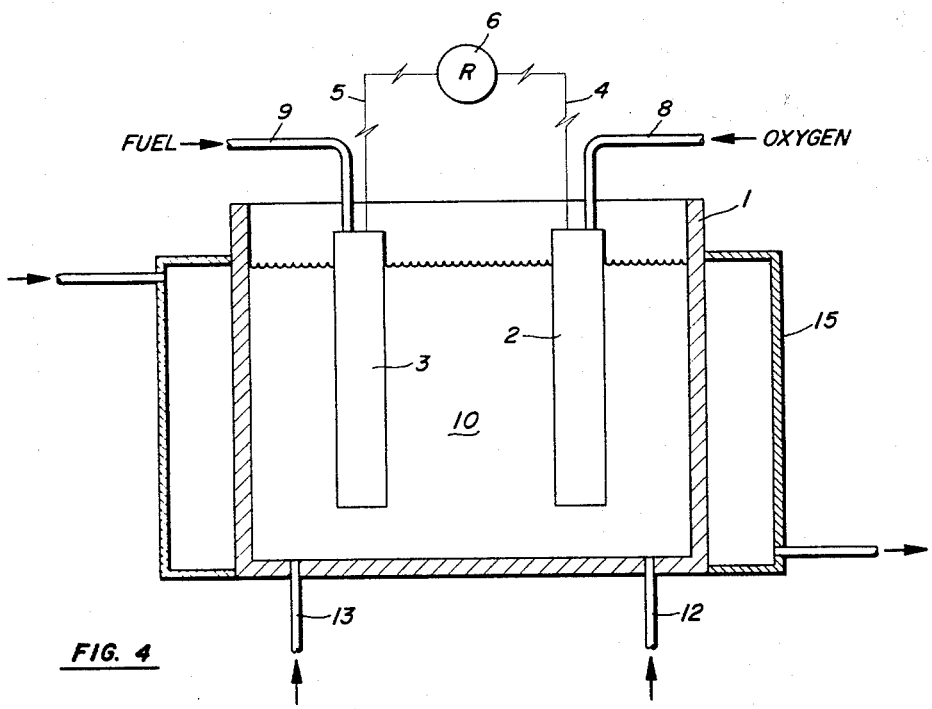
FIG. 4
MORTON BELTZER   INVENTORS
HUGH H. HOROWITZ
BY Henry Berk
PATENT ATTORNEY United States Patent Office 3,441,443
Patented Apr. 29, 1969

3,441,443
PROCESS OF OPERATING FUEL CELL WITH HYDROCARBON FUEL AND PYROPHOSPHORIC ACID ELECTROLYTE
Morton Beltzer, New York, N.Y., and Hugh H. Horowitz, Elizabeth, N.J., assignors to Esso Research and Engineering Company, a corporation of Delaware
Filed Oct. 18, 1965, Ser. No. 497,008
Int. Cl. H01m 27/22
U.S. Cl. 136—86                              1 Claim

ABSTRACT OF THE DISCLOSURE

Pyrophosphoric acid at between 250° C. and 350° C. is used as the electrolyte in a fuel cell.

---

Figure 1:
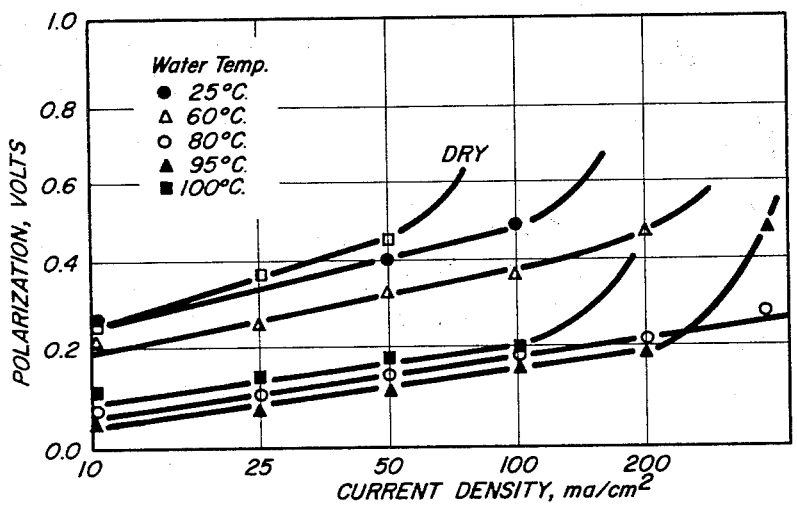

The present invention relates to new and useful improvements in electrochemical cells. In general, the present invention relates to electrolytes for electrochemical cells operating at temperatures above 250° C. In particular, this invention relates to fuel cells employing pyrophosphoric acid electrolytes.

The term "fuel cell" is used herein and in the art to denote a device, system or apparatus wherein chemical energy of a fluid combustible fuel, e.g., hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte, and means for admitting a fluel oxidant into dual contact with the cathode and electrolyte. Where necessary or desired, the electrolyte compartment is divided into an anolyte compartment and a catholyte compartment by an ion-permeable partition or ion-exchange membrane. Such membranes must, of course, be stable at the temperatures encountered with the cell. Thus, in each such cell, a fluid fuel is passed to the anode and there oxidized electrochemically, giving up electrons to the anode, while a fluid oxidant is passed to the cathode and there reduced upon receiving electrons from such cathode. Since the voltage developed by an individual cell is low, it is usually preferable to employ relatively small cells and to electrically connect large numbers of such cells in series, or in both series and parallel.

The invention is also applicable to "electrolytic cells," which, unlike the aforementioned fuel cells, do not provide a net production of electrical energy but in which an organic fuel is oxidized electrochemically at the anode thereof. In such cells a direct current of electrical energy from an external source, e.g., a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g., conversion of alcohols to ketones, hydrocarbons to carboxylic acids, etc.

The term "electrochemical cell" is used herein and in the art to denote the genus of the aforementioned "fuel cell" and "electrolytic cell."

In most of the cells of the type hereinbefore described, catalysts are employed to promote the reactions within the cell. Generally, the catalysts are an integral part of one or more of the electrodes. In many cells, noble metal catalysts are utilized. Because of the expensiveness of such noble metal catalysts, continuing efforts have been made to improve the performance of such cells, thereby allowing a reduction in the amount of noble metal catalysts required. One method of increasing the utilization of noble metal (e.g. platinum) catalyst, is to operate such cells at higher temperatures. Prior art cells employing aqueous electrolytes have inherent maximum temperature limitations above which the cell may not be operated without destroying the aqueous electrolyte.

In addition to the increased noble metal catalyst utilization, cell performance may be improved in several other respects by operating at increased temperatures. For instance, limiting currents can be significantly increased and polarization can be significantly decreased.

It has now been discovered that pyrophosphoric acids are effective electrolytes for electrochemical cells operating at temperatures above 250° C., for example, at temperatures in the range of about 250° to about 350° C. Solid pyrophosphoric acid, prepared by reacting one mole of $P_2O_5$ with two moles of $H_2O$, is composed of the pure phase $H_4P_2O_7$. When heated above the melting point it converts to a complex equilibrium mixture of various acids ranging from ortho- and pyro- to penta- and even higher molecular weight phosphoric acids. Hereafter the term "pyrophosphoric acid" is used to define not only the pure phase $H_4P_2O_7$ but also the above-described complex equilibrium mixtures which exist at temperatures above 250° C.

Pyrophosphoric acid is a suitable electrolyte for cells operating at temperatures above 250° C., since such acid, in addtion to being thermally stable in the operating temperature range of interest, exhibits conductivity, buffering capacity, and hydrocarbon reactivity compatibility (i.e. "hydrocarbon performance") required of suitable electrolytes.

In order to be a suitable electrolyte, a material must exhibit electrolytic conductivity. In the case of pyrophosphoric acid, since little free water is present self-dissociation is required to produce electrolytic conductivity. Measurements made in a standard conductivity cell with an AC bridge indicated that pyrophosphoric acid has a specific resistance of 2.6 ohm cm. at 250° C. Thus, it is apparent that pyrophosphoric acid is sufficiently conductive for use as an electrolyte in the temperature region of interest.

Another important property of an electrolyte is that it minimizes ionic concentration polarization at the electrodes of the cell. In order to demonstrate this property of pyrophosphoric acid, tests employing pyrophosphoric acid at a temperature of 250° C. were conducted. At the anode, hydrogen, which would be expected to exhibit no polarization was reacted at a sintered platinum-Teflon electrode. No polarization was detected at current densities up to 1,000 ma./cm.² Cathode ionic concentration polarization was measured by evolving hydrogen concentration polarization was measured by evolving hydrogen from the sintered platinum-Teflon cathode. As at the anode, no polarization was found at the cathode at current densities up to 1,000 ma./cm.² These results indicate that in pyrophosphoric acid at over 250° C. there is essentially no ionic concentration polarization at either electrode.

Having established the conductivity and buffering capacity of pyrophosphoric acid at temperatures above 250° C., tests were conducted to determine hydrocarbon activity in pyrophosphoric acid at temperatures above 250° C.

Figure 2:
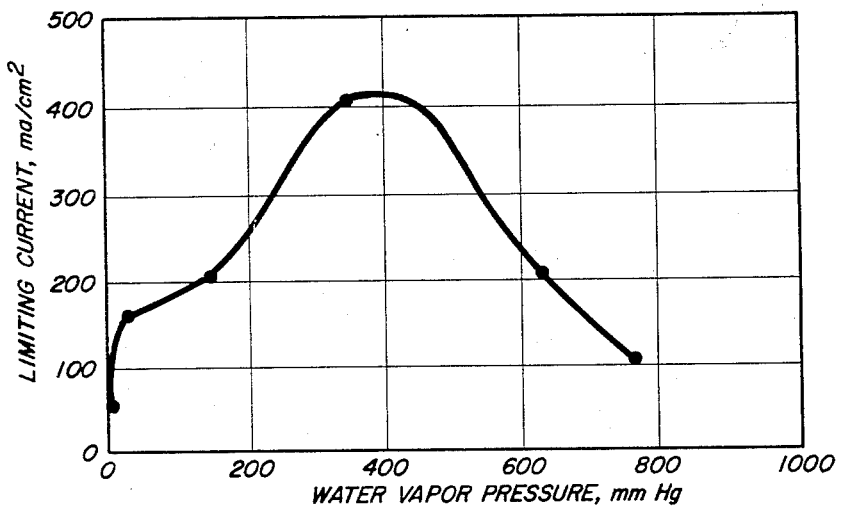

Several hydrocarbon fuels were tested for their activity in pyrophosphoric acid at a temperature of 250° C. Ethane, decane, hexane, 2-methyl pentane and cyclohexane, 1-hexene and benzene all exhibited higher activity when tested in pyrophosphoric acid at 250° C. than when tested in 85% $H_3PO_4$ at 150° C. or 30% $H_2SO_4$ at 100° C. It was discovered that a proper supply of water in systems employing pyrophosphoric acid electrolyte is critical. It was found that if there is insufficient water in the hydrocarbon feed the hydrocarbon reactivity is hindered. On the other hand, if there is too much water, the electrode becomes hydrocarbon concentration limited. This influence of water vapor upon hydrocarbon activity is demonstrated in FIGURE 1 which shows the water vapor influence on butane activity in a pyrophosphoric acid electrolyte at a temperature of 250° C. As shown in FIGURE 1, the butane performance was found to be quite sensitive to the partial pressure of water in the fuel feed. The amount of water in the butane was controlled by passing the butane through a water reservoir prior to entering the cell. The cell comprised a quartz electrolyte compartment containing pyrophosphoric acid maintained at a temperature of 250° C. and utilized sintered platinum-Teflon electrodes containing 50 ma./cm.$^2$ of catalyst. It is seen in FIGURE 1 that the polarization at moderate current densities decreases with increasing water temperature up to 95° C., reversing the trend as the boiling point is approached. The limiting current also increases up to a maximum of about 400 ma./cm.$^2$ at a water temperature of 80° C., falling off above this temperature. FIGURE 2 shows the effect of water vapor on butane limiting current.

From the above, it is apparent that optimum hydrocarbon performance is obtained in cells employing a pyrophosphoric acid electrolyte at temperatures above 250° C. when the water vapor in the hydrocarbon feed is in the range of about 290 mm. Hg to about 525 mm. Hg, corresponding, respectively, to water temperatures of about 75° to about 90° C.; preferably the water vapor in the hydrocarbon feed is about 350 mm. Hg, corresponding to a temperature of about 80° C.

In order to determine the oxygen performance in phosphoric acid electrolytes at temperatures above 250° C., tests were conducted using a sintered platinum-Teflon electrode. These tests indicated limiting currents in excess of 750 ma./cm.$^2$. Substituting air for oxygen higher performances than with oxygen on similar electrodes in 14.7 M$H_3PO_4$ at 150 C. were obtained. FIGURE 3 compares the performance of oxygen and air in pyrophosphoric acid as compared to 14.7 phosphoric acid. Tests with oxygen performance indicated that humidification of the gas feed was not essential, as in the case of the hydrocarbon fuel feed.

It is apparent that oxygen performance is substantially increased at the higher temperature possible in pyrophosphoric acid.

Electrochemical cells employing pyrophosphoric acid electrolyte and operating at temperatures above 250° C. may be designed to utilize either a gas or liquid fuel. In general, normally gaseous fuels or immiscible fuels are employed. The fuel may be any fluid combustible hydrogen containing fuel. Generally, saturated hydrocarbons will be employed. Unsaturated hydrocarbons polymerize in the presence of $P_2O_5$ so that substantial quantities of such materials should be avoided. As is apparent from the above, the fuel employed in the present invention will have a minimum moisture content corresponding to about 290 mm. Hg (at atmospheric pressure) and a maximum moisture content corresponding to about 525 mm. Hg.

The structural components of an electrochemical cell employing a pyrophosphoric acid electrolyte should be of acid resistance materials. Thus, suitable electrodes include porous carbon skeletons impregnated with suitable catalytic material and noncorrosive metal structures. Catalysts suitable for use with pyrophosphoric acid include gold, metals of platinum group, etc. Noble metal catalysts are preferred for use at the cathode. However, it should be understood that this invention is not dependent upon a particular catalyst. In the practice of this invention, one may use at the respective electrodes any anode and cathode catalysts known to the are for use in fuel cells having an acidic electrolyte. Naturally, there will be operable catalysts which are better than others for any given fuel.

Cell compartments and all other structural parts coming in contact with the electrolyte may be noble metals or acid resistant high molecular weight polymers.

The electrodes which may be employed in the present invention are well known in the art. Suitable electrode designs may include the conventional porous, nonporous, metallic and metal structures known to the art for use with acidic electrolytes. The terms "gas diffusion electrode" and "nondiffusion electrode" have acquired a meaning in the art and are employed herein in accordance with such meaning. Basically, the meaning of the terms is concerned with the manner in which they are employed although certain types of electrode structures have become identified with one or the other of such terms. An electrode functions as a diffusion electrode when a reactant gas, i.e., fuel or oxidant as the case may be, passes into, through or along a surface of the electrode before contacting the liquid electrolyte. An electrode functions as a nondiffusion electrode when the half-cell reaction involved is carried out with the reactant passing directly into the electrolyte without first contacting the elecrode.

The most common type of electrode structure utilized as a diffusion elecrode is the porous electrode of carbon or suitable metal. These may take the form of a unit comprising two or more places of different porosity or a single structure of the so-called "dual porosity" type wherein relatively large pores containing gas and relatively small pores containing liquid electrolyte meet or intersect within a conductive material.

The operation of a cell employing a pyrophosphoric acid electrolyte at a temperature above 250° C. will be more easily understood by referring to the FIGURE 4 which represents a simple version of a single cell. It is to be understood that structural changes may be effected and that the design of such a cell, while maintaining all essential parts thereof, admits, for example, a combination of cells in a cell pact.

Referring now to FIGURE 4, there is schematically illustrated a simple fuel cell which may be used for carrying out this invention. Shown in the drawing are a vessel 1, a cathode 2 and an anode 3. Cathode 2 and anode 3 are electrically connected by wires 4 and 5 and resistance means 6 which may be any device for utilizing electric current or merely an extension of wires 4 and 5. Vessel 1 of quartz or other suitable material forms an electrolyte compartment and is here shown uncovered although in practical employment such cells would ordinarily be covered. Cathode 2 and anode 3 may, for example, be hollow, porous cylinders, metal sheets or grids; a metal surfaced nonconductor; or, in other embodiments may take the form of a porous carbon plate where the electrode is built into the wall forming the electrolyte compartment. Cathode 2 and/or anode 3 may be impregnated with a suitable metal catalyst. Preferably anode 3 is impregnated with a noble metal (e.g., platinum) that is chemically resistant to the electrolyte, mixtures of the same (e.g., platinum-iridium, platinum-rhenium) or mixtures of these metals with gold. When cathode 2 and anode 3 are diffusion electrodes a fluid oxidant (e.g., oxygen gas) is admitted to the interior of cathode 2 via conduit 8 and a fluid fuel (e.g., hydrogen) is admitted to the interior of anode 3 via conduit 9. When cathode 2 and anode 3 are nondiffusion electrodes, e.g., metal sheets or metal grids, a fluid oxidant (e.g., air) is admitted to electrolyte compartment 10 via conduit 12 and a fluid fuel (e.g., decane) is admitted to electrolyte compartment 10 via conduit 13. Electrolyte compartment 10 contains pyrophosphoric acid maintained at a temperature of 250° C. or above, e.g., 250° C. The cell is provided with suitable means for maintaining electrolyte temperature. For example, vessel 1 may be provided with jacket 15, as shown in the drawing. The electrolyte will become heated from the irreversible heat of reaction. If the electrolyte temperature exceeds the temperature desired, water, or other coolant, in the jacket will cool the vessel and electrolyte to the desired temperature.

The invention will be more fully understood from the following example.

EXAMPLE

Using a fuel cell substantially as described in FIGURE 4, butane is employed as the fuel and oxygen as the oxidant. Anode and cathode each consist of platinum catalyzed carbon electrodes with a catalyst content of 5 mg./cm.$^2$. The pyrophosphoric acid electrolyte is maintained at a temperature of about 275° C. The butane feed is passed through a water bath maintained at a temperature of about 80° C. prior to entering the cell. Typical cell performance is shown in the following table.

BUTANE-OXYGEN UNIT CELL PERFORMANCE

| Ma./cm.$^2$: | Cell voltage excluding ohmic losses |
|---|---|
| 10 | 0.58 |
| 25 | 0.51 |
| 50 | 0.41 |
| 100 | 0.33 |
| 150 | 0.31 |
| 200 | 0.29 |
| 250 | 0.20 |

It is apparent from the foregoing description that the present invention may be modified without departing from the spirit and scope thereof. The test results, for example, are presented for purposes of illustration only and the details should not be construed as limitations of the true scope of the invention as set forth in the claim.

What is claimed is:

1. A process for operating a fuel cell which comprises electrochemically oxidizing a saturated hydrocarbon moisturized to have a moisture content corresponding to a water vapor pressure in the range of about 290 mm. Hg to 525 mm. Hg at a total pressure of one atmosphere for the moisturized hydrocarbon fuel at an anode in the presence of an electrolyte consisting of a liquid pyrophosphoric equilibrium mixture having the composition of $H_4P_2O_7$ with respect to its contents of $P_2O_5$ and $H_2O$ at a temperature between 250° C. and 350° C., and maintaining the temperature of the electrolyte between 250° C. and 350° C.

References Cited

UNITED STATES PATENTS

| 2,992,143 | 7/1961 | Clifford et al. | 136—155 X |
| 2,839,408 | 6/1958 | Griffith | 204—103 |
| 3,223,556 | 12/1965 | Cohn et al. | 136—86 |
| 3,276,910 | 10/1966 | Grosselli et al. | 136—86 |
| 3,297,484 | 1/1967 | Niedrach | 136—86 |
| 3,328,204 | 6/1967 | Grubb | 136—86 |

FOREIGN PATENTS 332,660    7/1930    Great Britain.

ALLEN B. CURTIS, *Primary Examiner.*

U.S. Cl. X.R.

136—154